July 26, 1960

G. P. B. MARTIN 2,946,582

VEHICLE SUSPENSION

Filed Aug. 13, 1956

3 Sheets-Sheet 1

INVENTOR
Gavin P.B. Martin
BY Harness, Dickey & Pierce
ATTORNEYS.

July 26, 1960  G. P. B. MARTIN  2,946,582
VEHICLE SUSPENSION
Filed Aug. 13, 1956  3 Sheets-Sheet 2

INVENTOR
Gavin P.B. Martin
BY Harness, Dickey & Pierce
ATTORNEYS.

July 26, 1960 G. P. B. MARTIN 2,946,582
VEHICLE SUSPENSION
Filed Aug. 13, 1956 3 Sheets-Sheet 3

INVENTOR
Gavin P. B. Martin
BY Harness, Dickey & Pierce
ATTORNEYS

United States Patent Office 2,946,582
Patented July 26, 1960

2,946,582

VEHICLE SUSPENSION

Gavin Patrick Blandy Martin, Leeds, England, assignor to Jonas Woodhead & Sons Limited, Leeds, England, a British company Filed Aug. 13, 1956, Ser. No. 603,626

7 Claims. (Cl. 267—64)

This invention relates to vehicle suspensions and has for its object to evolve suspension units which will provide a substantially constant ride quality over a wide range of loads, both spring rate and damping increasing with load, and which will moreover provide a constant riding height and vehicle trim irrespective of the load.

According to the invention there is provided a suspension unit for interposition between the axle or unsprung part of a vehicle and the body or sprung part of such vehicle said unit comprising a working chamber containing a piston, diaphragm or like pressure responsive member to one side of which latter a compressible fluid such as air is supplied, means whereby relative movement between the unsprung and sprung parts of the vehicle will result in a substantially non-compressible fluid such as oil being pumped into said working chamber at the other side of said piston, diaphragm or the like and valve means adapted to be opened at a preselected ride level thereby to permit excess non-compressible fluid to escape from the working chamber to a reserve chamber whence it may be withdrawn for re-circulation by the pump means.

In order that the nature of the invention may be more readily understood several constructional forms will now be described in detail with reference to the accompanying drawings which show five suspension units in section.

Each of the suspension units illustrated is intended to be attached at the lower end to the axle or unsprung portion of the vehicle and at its upper end to the body or sprung portion of such vehicle.

Figure 1:
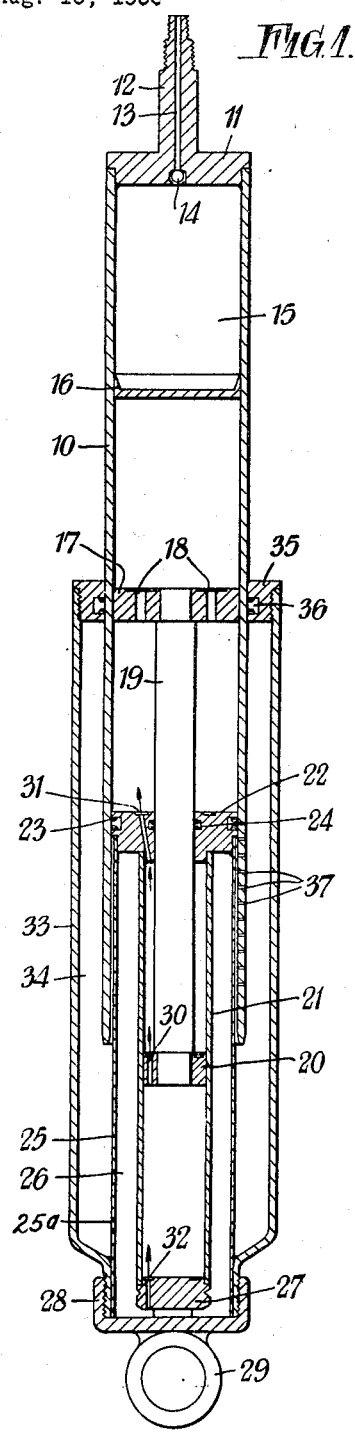

Referring now to Figure 1, 10 denotes a cylinder which is closed at its upper end by means of closure member 11 incorporating a stem 12 having an axial bore 13 therein. Located in the bore 13 is a non-return valve 14 similar to a valve generally incorporated in a pneumatic tire said valve being operative to allow air or other compressible fluid under pressure to enter a working chamber 15 in the upper part of said cylinder. Disposed within the cylinder is a floating piston 16 which is preferably made of a so-called plastic or other similar material having resilient properties. At a point intermediate its length the cylinder is provided with a partition member 17 which is fixedly secured in position as by brazing. The member 17 is formed with a plurality of apertures 18 to allow passage of fluid or liquid therethrough and it is moreover adapted to carry a piston rod 19 the latter being fixedly mounted in position thereon. At its lower end the piston rod 19 carries a piston 20 which is a close fit within a pressure tube 21. The piston rod is guided by means of an annular rod guide 22 which serves to close the upper end of said pressure tube. The rod guide 22 is a close fit within the cylinder 10 and an oil seal 23 is interposed between said guide and said cylinder, a further seal being also interposed between said guide and the piston rod. The pressure tube 21 is enclosed within a further concentric tube 25 which is secured as by brazing to the rod guide 22, the annular space 26 between the tubes 21 and 25 being adapted to constitute a reserve chamber. The pressure tube 21 is closed at its lower end by a base valve assembly 27 which latter rests on a bottom closure member 28 having an anchor attachment 29 for attachement to the unsprung part of a vehicle. The piston 20 the rod guide 22 and the base valve assembly 27 incorporate non-return or one way valves 30, 31 and 32 respectively which are adapted to allow fluid flow in one direction only i.e. in the direction of the arrows. The closure member 28 serves also to close the lower end of the reserve chamber 26. A further concentric tube 33 is brazed or otherwise secured at its lower end to the tube 25, said tube 33 being adapted to provide an outer reserve chamber 34 which is closed at its upper end by an annular filler plug 35 the latter being a close fit on the cylinder 10 and carrying an oil seal 36. The intermediate tube 25 is apertured as at 25a near its lower end to allow free flow of fluid between the reserve chamber 26 and the outer reserve chamber 34. It will be noted that cylinder 10 which is preferably given a smooth finish on both sides is provided at its lower part with a plurality of apertures 37.

As indicated above air under pressure or some other compressible fluid is supplied to the working chamber 15 above the piston 16 and it will be assumed that oil or some other incompressible fluid will be present in the reserve chambers and the pressure tube.

When the suspension unit is in use and is alternately compressed and extended oil will be drawn from the reserve chamber 26 and caused to pass into the working chamber below the piston 16. By reason of the nature of the valves 30, 31 and 32 no return flow of oil can take place through them when the unit is compressed, and thus the unit will continue to extend, building up pressure in the chamber 15 until the ride level position is reached. At this point the rod guide 22 will be in such a position that the first of the apertures 37 in the cylinder wall will become uncovered thereby allowing escape of oil from the working chamber to the outer reserve chamber 34 and thence to the reserve chamber 26. It will be appreciated that the action of the unit is such that under dynamic conditions it will tend to maintain a constant length thus giving a constant riding height to the vehicle to which it is fitted. It may be mentioned here that since the piston 16 is subject to equal pressure on both sides there will be no tendency for either oil or air to leak past it.

Figure 2:
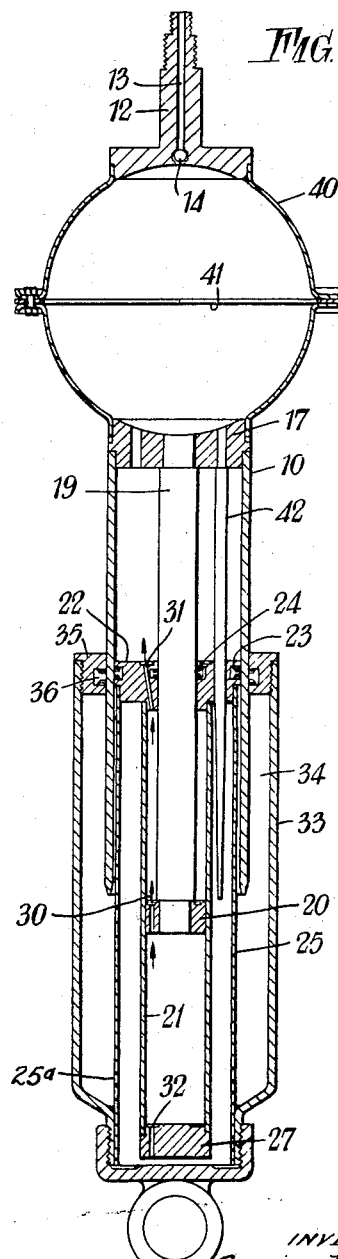

In the embodiment shown in Figure 2 the working chamber is in the form of spherical vessel 40 and the piston 16 is replaced by the diaphragm 41 which serves to separate the air or other compressible fluid in the upper part of the vessel from the oil or other non-compressible fluid in the lower part. This construction may give better sealing in some circumstances and it will result in a reduction in the dead length of the unit. In this case also there is a difference in the ride height valve, i.e. the apertures 37 in the cylinder 10 are dispensed with and the partition member 17 is provided with one or more needles such as indicated at 42 adapted to cooperate with one or more corresponding apertures in the rod guide 22. As will be seen the lower part of each needle is tapered while the upper part is cylindrical the arrangement being such that in the position shown the flow of oil into the reserve chamber 26 will be prevented but that as the unit extends and reaches the ride level position the aperture or apertures in the rod guide 22 will be progressively opened to allow escape of oil from the working chamber to said reserve chamber.

Figure 3:
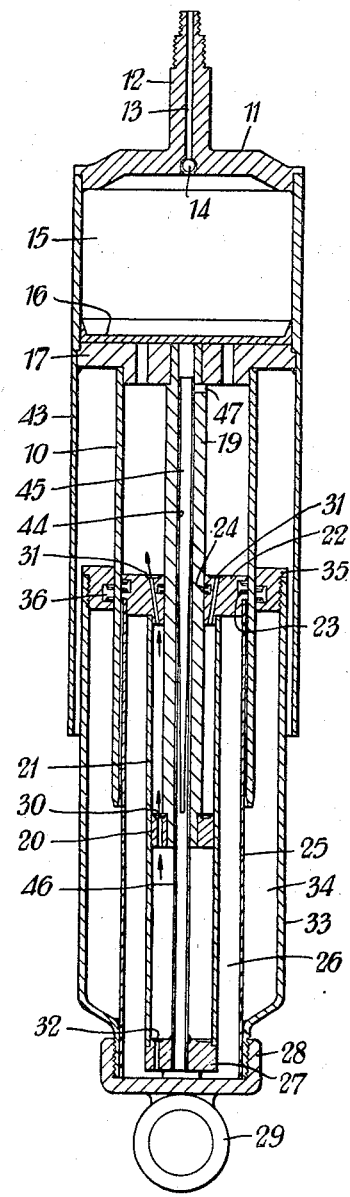

In the embodiment shown in Figure 3 the diameter of the working chamber has been increased to reduce the dead length while retaining the same volume and the opportunity has been taken to incorporate a dirt shield 43. In this case also the ride height valve has again been modified and it will be seen that the piston rod 19 is provided with an axial bore 44 in which a needle valve member 45 is fixedly positioned said member being adapted to cooperate with a tube 46 which is carried by the base valve assembly 27. A radially directed port 47 allows for flow of oil into the bore 44. With the construction illustrated in Figure 3 it will be apparent that in the position shown passage of oil through the bore 44 and into the tube 46 and thence into the reserve chamber 26 will be prevented. As the unit expands however relative movement between the valve member 45 and said tube 46 will take place and at the ride level position oil will escape from the working chamber back to the reserve chamber 26 via the port 47, the bore 44 and the tube 45. The arrangement shown in Figure 3 has the advantage that the ends of the unit can be relatively turned to each other and also that any air which may tend to accumulate under the partition member 17 will be expelled.

Figure 4:
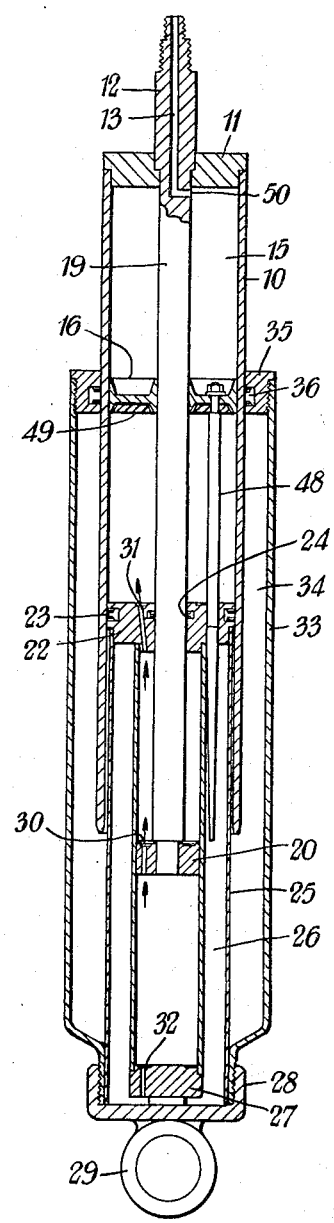

In the embodiment shown in Figure 4 a needle valve member 48 cooperating with an aperture in the rod guide 22, similarly to the construction illustrated in Figure 2, is carried by the floating piston 16. In this case the partition member 17 is dispensed with, the piston 16 being provided with a support washer 49 and being slidable on the piston rod 19 which in this instance is formed integrally with or carried by the closure member 11. In this case also air or other compressible fluid under pressure will be supplied to the working chamber 15 through a non-return valve located in a bore 50 formed in the piston rod 19. The embodiment shown in Figure 4 has the advantage that the movement of the needle valve member is very much reduced and also that the dead length of the unit is somewhat less, but it is not claimed to give a constant riding height.

Figure 5:
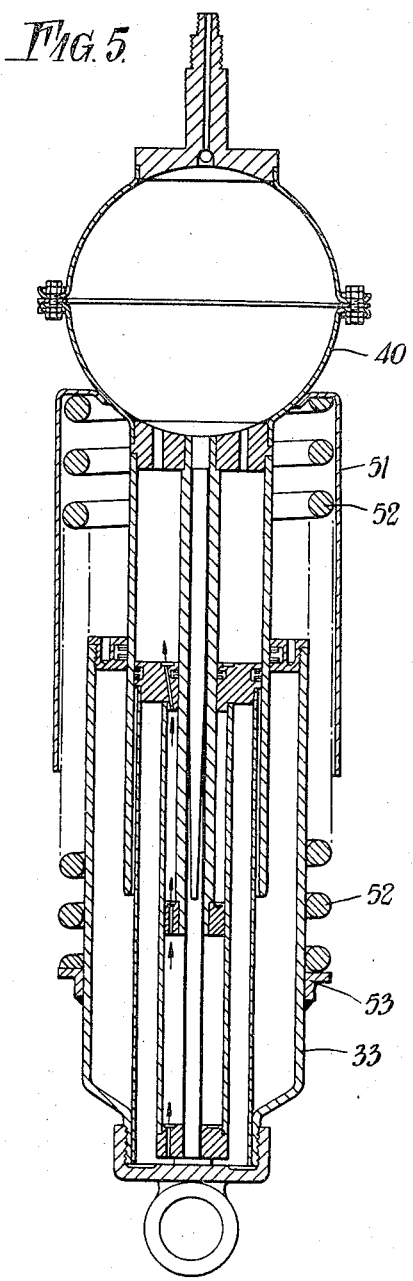

It would obviously be possible in any of the embodiments above described to incorporate spring means which would serve to support a portion of the external load applied to the unit and Figure 5 illustrates by way of example the addition for such purpose of a coil spring to a suspension unit of the kind shown in Figure 2. Since the actual unit is generally the same as that shown in Figure 2 it will not be necessary again to describe the same in detail but it will be seen from Figure 5 that the unit is in this case provided with a dust shield 51 which is brazed or welded to the outer surface of the spherical vessel 40. The dust shield 51 is so formed as to provide an abutment for one end of a coiled spring 52 which bears at its other end against an annular abutment 53 brazed or welded to the outer surface of the tube 33. Obviously a spring such as is indicated at 52 might readily be applied to any other of the embodiments illustrated and moreover while it is shown as being applied externally of the unit it might nevertheless well be incorporated within the unit i.e. internally thereof.

It will be appreciated that any of the units indicated above will constitute a compact and easily detachable unit such as may be supplied complete by a component manufacturer. Each such unit is a complete suspension in itself and apart from the provision of a suitable rubber or other resilient bump stop it will avoid the necessity for springs or shock absorbers.

A further feature is that none of the units above described depends upon 100% sealing as the working fluid is expendible. Although the final seal is not normally immersed or under pressure it may prove preferable to incorporate in any vehicle to which such units are fitted a central reservoir in much the same manner as the fluid reservoir provided in hydraulically operated brake systems. There is however no need for an engine driven pump or a pressure reservoir.

It will be appreciated that when any of the units above described is fitted on a vehicle the relative movement between the sprung and unsprung portions of the vehicle is utilized to pump fluid from the reserve to the working chamber to replace the leakage which will inevitably take place. Due to the leakage a vehicle equipped with suspension units according to the invention will when left stationary for any length of time, subside on to its bump stops unless prevented from so doing by some external means. When, however, the vehicle is driven again it will attain normal riding height after a short distance. Similarly it will subside when the load is increased but it will again attain normal riding height and trim when driven for a short distance.

It will also be appreciated that work will be done in pumping oil against the pressure in the working chamber and this provides inherent damping. An additional damping effect may also, if required, be provided by throttling the flow of oil or other non-compressible fluid through the valves.

The apertures 37 shown in Fig. 1, and the needle valves shown in the other figures all act as closable modulating valves between the working chamber and the reserve chamber, opening wider as the unit extension is increased beyond the ride level point. This action provides improved damping, and materially assists in maintaining a constant ride level. The term modulating is used herein to denote a valve arranged to open relatively gradually as contrasted with a valve which is opened completely in response to a relatively short extension travel of the unit.

I claim:

1. A telescopic suspension unit for interposition between sprung and unsprung parts of a vehicle comprising means defining a working chamber, means actuatable by relative movement between said sprung and unsprung parts for pumping an incompressible fluid into said chamber, means for extending said unit in response to an increase of said incompressible fluid in said chamber, and limit means limiting the extension of said unit that may be effected by said incompressible fluid, said pumping means including a cylinder fixedly mounted with respect to a first member of said unit, a piston disposed in borefitting engagement within said cylinder and fixedly mounted with respect to a second member of said unit, said second member being arranged for telescoping reciprocating movement with respect to said first member, means for closing both ends of said cylinder, one-way valves disposed at each end of said cylinder and in said piston and arranged to permit fluid flow through said cylinder and said piston only in a predetermined direction.

2. A telescopic suspension unit for interposition between sprung and unsprung parts of a vehicle comprising means defining a working chamber, means actuatable by relative movement between said sprung and unsprung parts for pumping an incompressible fluid into said chamber, means for extending said unit in response to an increase of said incompressible fluid in said chamber, said pumping means including a pumping cylinder fixedly mounted with respect to a first member of said unit, a piston in borefitting sliding engagement with said cylinder and fixedly mounted with respect to a second member of said unit, a one way valve in said piston arranged to permit fluid flow through said piston in a direction from said first member toward said second member, said second member being telescopically reciprocable with respect to said first member, a reserve cylinder coaxially fixed with respect to and spacedly surrounding said pumping cylinder and defining in conjunction therewith a reserve chamber, a second one-way valve arranged to permit fluid flow from said reserve chamber into the bore of said pumping cylinder at one end thereof, a third one-way valve arranged to permit fluid flow into said working chamber from the end of said bore opposite from said one end thereof, a common closure member arranged to seal said opposite end of said bore, one end of said reserve cylinder and said working chamber, said third one-way valve being carried by said closure member and defining a passageway therethrough, and limit means limiting the extension of said unit that may be effected by said incompressible fluid, said limit means including a plurality of bleed passageways, and means for progressively connecting said passageway in parallel flow relationship between said working chamber and said reserve chamber as said unit is extended beyond a predetermined point.

3. A telescopic suspension unit for interposition between sprung and unsprung parts of a vehicle comprising means carried by a first part of said unit and defining a working chamber, a pumping tube fixed with respect to a second part of said unit reciprocable with said first part, a reserve cylinder fixedly mounted in coaxial alignment with and spacedly surrounding said pumping tube and defining in conjunction therewith a reserve chamber, a piston movable with said first part and disposed in sliding borefitting engagement with said pumping tube, one-way valves disposed at each end of said pumping tube and in said piston and arranged to permit fluid flow through said pumping tube and said piston from said reserve chamber into said working chamber in response to pressure changes occasioned by reciprocation of said first and second parts with respect to each other, a common closure member arranged to close said pumping tube, said reserve chamber, and said working chamber, a bore formed in said closure member connecting said working chamber with said reserve chamber, a needle mounted coaxially within said bore and including a portion that may be fitted closely therein to close said bore against fluid flow therethrough and a tapered portion of smaller cross section than said bore, said needle being mounted for movement relative to said bore in response to relative movement between said first and second parts and being positioned within said bore to close said bore when said parts are in one relative position and to open said bore when said parts move apart from each other away from said one relative position thereby to permit fluid to escape from said working chamber into said reserve chamber and thus to limit the extension of said unit.

4. A telescopic suspension unit for interposition between sprung and unsprung parts of a vehicle comprising means defining a working chamber, means actuatable by relative movement between the sprung and unsprung path of the vehicle for pumping an incompressible fluid into said chamber, means for extending said unit in response to an increase of incompressible fluid in said chamber, said pumping means including a cylinder mounted on a first member of said unit, a piston slidably fitted within said cylinder, said piston being connected to a second member of said unit and reciprocatable thereby relative to said cylinder in response to alternate compression and extension of said unit, means for closing both ends of said cylinder, and one-way valves disposed respectively at each end of said cylinder and in said piston and arranged to permit fluid flow through said cylinder and said piston only in a predetermined direction.

5. The suspension unit of claim 1 wherein said limit means includes a bore formed in said closing means at one end of said cylinder, said bore providing communication between said cylinder and said working chamber, a needle having a cylindrical portion and a tapering portion, said needle being fixedly mounted on said second member of said unit reciprocably movable with respect to said first member and extending through said bore, the cylindrical portion of said needle being substantially the same diameter as said bore and being effective to close said bore when said first and second members are in one relative position with respect to each other, the cylindrical portion of said needle being drawn out of said bore in response to relative movement between said first and second members in a predetermined direction away from said one relative position to permit said incompressible fluid to escape from said working chamber when said members so move.

6. The suspension unit of claim 1 wherein said limit means includes a dividing member movably disposed within said working chamber and arranged to divide said working chamber in a portion for containing a compressible fluid and a portion for containing said incompressible fluid, said dividing member being responsive in position relative to said working chamber to changes in fluid pressure therein, an axially extending needle mounted on said movable member for travel therewith, a bore formed in said closing means at one end of said cylinder, said bore being shaped and positioned to receive said needle so that movement of said needle in said bore is effective to control the escape of said incompressible fluid from said working chamber, thereby to limit the extension of said unit effectible by said incompressible fluid.

7. The suspension unit of claim 1 wherein a compression coil spring is mounted coaxially with said unit and arranged to urge it toward its extended position, thereby to support a part of the external load imposed on said unit.

References Cited in the file of this patent

UNITED STATES PATENTS

| | | |
|---|---|---|
| 1,861,821 | Schaum | June 7, 1932 |
| 2,436,573 | Heynes | Feb. 24, 1948 |
| 2,559,968 | Katz | July 10, 1951 |
| 2,774,446 | Bourcier De Carbon | Dec. 18, 1956 |